United States Patent
Moon et al.

(10) Patent No.: US 8,863,554 B2
(45) Date of Patent: *Oct. 21, 2014

(54) FLOAT BATH FOR MANUFACTURING FLOAT GLASS AND COOLING METHOD OF THE SAME

(75) Inventors: Won-Jae Moon, Seoul (KR); Yang-Han Kim, Goyang-si (KR); Sang-Oeb Na, Seoul (KR); Jeong-Deok Kim, Seoul (KR); Heui-Joon Park, Paju-si (KR); Jin Han, Goyang-si (KR); Woo-Hyun Kim, Dongducheon-si (KR); Dong-Shin Shin, Incheon (KR); Jae-Han Jun, Paju-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,628

(22) Filed: Aug. 11, 2011

(65) Prior Publication Data

US 2012/0040818 A1 Feb. 16, 2012

(30) Foreign Application Priority Data

Aug. 12, 2010 (KR) ......................... 10-2010-0077856

(51) Int. Cl.
*C03B 18/18* (2006.01)
*C03B 18/16* (2006.01)

(52) U.S. Cl.
CPC ................. *C03B 18/18* (2013.01); *C03B 18/16* (2013.01)
USPC ................. 65/99.3; 65/99.2; 65/355

(58) Field of Classification Search
CPC ........ C03B 18/16; C03B 18/18; C03B 18/02; C03B 25/08; C03B 29/08; C03B 5/425
USPC ...................... 65/99.1–101, 89, 193, 253–259
See application file for complete search history.

(56) References Cited

U.S. PATENT DOCUMENTS

| | | | | |
|---|---|---|---|---|
| 1,893,061 | A * | 1/1933 | Peiler | 65/346 |
| 2,042,660 | A * | 6/1936 | Hulton | 432/4 |
| 2,199,355 | A * | 4/1940 | Underwood | 65/137 |
| 3,140,164 | A * | 7/1964 | Long | 65/157 |
| 3,183,072 | A * | 5/1965 | Long | 65/333 |
| 3,574,589 | A * | 4/1971 | Yockey | 65/268 |
| 3,628,596 | A * | 12/1971 | Easton et al. | 164/440 |
| 3,658,504 | A * | 4/1972 | Loukes et al. | 65/182.3 |
| 3,796,558 | A * | 3/1974 | Ton That | 65/206 |
| 3,894,859 | A * | 7/1975 | Scott et al. | 65/99.2 |

(Continued)

FOREIGN PATENT DOCUMENTS

| | | |
|---|---|---|
| DE | 102006059356 A | 6/2008 |
| JP | H06-210339 | 8/1994 |
| KR | 2003-0074260 | 9/2003 |

*Primary Examiner* — Jodi C Franklin

(74) *Attorney, Agent, or Firm* — McKenna, Long & Aldridge LLP

(57) ABSTRACT

A float bath for manufacturing a float glass includes a brick assembly composed of a plurality of bricks storing a molten metal so that a float glass is capable of moving forward while floating on the molten metal, a bottom casing for forming an outer side of the brick assembly, and an air blower installed away from the bottom casing to supply a cooling air toward the bottom casing. The air blower includes a plurality of nozzles having a diameter of about 30 mm and arranged with a pitch of about 250 mm to about 300 mm in order to cool the bottom casing to a predetermined temperature.

3 Claims, 2 Drawing Sheets

(56) References Cited

U.S. PATENT DOCUMENTS

| | | | | |
|---|---|---|---|---|
| 3,918,950 A * | 11/1975 | Stilley | | 65/114 |
| 3,961,928 A * | 6/1976 | Jago et al. | | 65/29.18 |
| 4,174,956 A * | 11/1979 | Gagne | | 65/99.3 |
| 4,197,106 A * | 4/1980 | Trevorrow et al. | | 65/99.3 |
| 4,402,722 A * | 9/1983 | Edge | | 65/99.3 |
| 4,424,071 A * | 1/1984 | Steitz et al. | | 65/337 |
| 4,711,655 A * | 12/1987 | Schultz | | 65/351 |
| 4,946,491 A * | 8/1990 | Barr | | 65/114 |
| 6,401,490 B1 * | 6/2002 | Yoshizawa et al. | | 65/25.4 |
| 8,051,677 B1 * | 11/2011 | Moon et al. | | 65/99.3 |
| 8,136,374 B2 * | 3/2012 | Moon et al. | | 65/162 |
| 2001/0002735 A1 * | 6/2001 | Hirota et al. | | 264/2.2 |
| 2001/0023166 A1 * | 9/2001 | Huynh et al. | | 451/73 |
| 2002/0038559 A1 * | 4/2002 | Hishinuma et al. | | 65/99.2 |
| 2004/0065115 A1 * | 4/2004 | Mueller et al. | | 65/29.17 |
| 2004/0126577 A1 * | 7/2004 | Lee et al. | | 428/364 |
| 2004/0134202 A1 * | 7/2004 | Omura et al. | | 62/64 |
| 2004/0191358 A1 * | 9/2004 | Gellert et al. | | 425/570 |
| 2006/0252356 A1 * | 11/2006 | Webster | | 451/65 |
| 2008/0098954 A1 * | 5/2008 | Banks | | 118/300 |
| 2008/0223079 A1 * | 9/2008 | Kamihori et al. | | 65/99.3 |
| 2009/0255264 A1 * | 10/2009 | McMasters et al. | | 60/747 |
| 2010/0006670 A1 * | 1/2010 | Bourrilhon et al. | | 239/240 |
| 2010/0223956 A1 * | 9/2010 | Moon et al. | | 65/169 |
| 2010/0223957 A1 * | 9/2010 | Moon et al. | | 65/182.3 |
| 2011/0123668 A1 * | 5/2011 | Budapanahalli | | 425/573 |
| 2011/0283740 A1 * | 11/2011 | Moon et al. | | 65/99.3 |
| 2012/0040817 A1 * | 2/2012 | Moon et al. | | 501/11 |
| 2012/0040818 A1 * | 2/2012 | Moon et al. | | 501/11 |

* cited by examiner

FLOAT BATH FOR MANUFACTURING FLOAT GLASS AND COOLING METHOD OF THE SAME

CROSS-REFERENCE TO RELATED APPLICATION

This application claims priority under 35 USC 119(a) to Korean Patent Application No. 10-2010-0077856 filed in the Republic of Korea on Aug. 12, 2010, the entire contents of which are incorporated herein by reference.

BACKGROUND OF THE INVENTION

1. Field of the Invention

The present disclosure relates to a float bath for manufacturing a float glass and a cooling method of the same. More particularly, the present disclosure relates to a float bath for manufacturing a float glass, having an improved structure for cooling a bottom casing surrounding bricks storing a molten metal, and a cooling method of the same.

2. Description of the Related Art

Generally, an apparatus for manufacturing a float glass (also known as sheet glass, flat glass, or plate glass) using a float glass process is used to manufacture a band-shaped (or, ribbon-shaped) float glass having predetermined width and thickness by continuously supplying molten glass onto a flowing molten metal stored in a float bath, floating the molten glass on the molten metal to form a molten glass ribbon, and pulling up the glass ribbon toward an annealing lehr near an exit of the float bath.

Here, the molten metal includes, for example, molten tin or molten tin alloy and has a greater specific gravity than the molten glass. The molten metal is received in a float chamber where reducing hydrogen ($H_2$) and/or nitrogen ($N_2$) gas is filled. The float chamber includes a bottom storing molten metal and a roof covering the bottom. In addition, the bottom (or, the float bath) storing molten metal has a horizontally extending structure and includes a high heat resistant material therein. The molten glass is supplied from an upstream side of the float bath onto the surface of the molten metal and forms a molten glass ribbon while moving to a downstream side. The molten glass ribbon is lifted up at a location (hereinafter, referred to as a take-off point) set on the downstream side of the float bath to be kept away from the molten metal, and is delivered to an annealing lehr of the next process.

Meanwhile, the molten metal in the float chamber is maintained at a high temperature (about 600° C. to 1,100° C.) and has a melting point of 232° C. Therefore, the bottom portion of the float bath needs to cool to a predetermined temperature. Otherwise, the molten metal may react with a base casing made of carbon steel material to create holes in the base casing, which may allow the molten metal to leak out of the float bath. In addition, in aspect of quality, if the inner temperature of the float bath changes (for example, −5° C. to +5° C.), the flow of the molten metal changes to generate bubbles, which may cause surface defects (for example, OBB (Open Bottom Bubble) or BOS (Bottom Open Seed) to a final product of the float glass. Therefore, the final product of the float glass produced through the float bath should maintain uniform temperature distribution in the float bath in aspect of quality, particularly OBB.

However, a general float bath system cools the bottom of the float bath by blowing a cooling air to the bottom casing by using an air blower. The cooling device using such an air blower uses a plurality of nozzles. Here, each nozzle has a diameter of about 60 mm, and a pitch between the nozzles is about 500 mm. In addition, an interval between the end of the nozzle and the bottom casing is about 300 mm. When measuring the temperature of the bottom of the above float bath system, the bottom has a highest temperature of 146.8° C., a lowest temperature of 69.1° C., and an average temperature of 103.5° C. Due to the large diameter of the nozzles used in the air blower for cooling the bottom of the float bath and the large pitch between the nozzles along with the large interval between the nozzle and the bottom casing, it is not easy to uniformly maintain the inner temperature of the float bath.

SUMMARY OF THE INVENTION

The present invention is designed to solve the problems of the prior art, and therefore it is an object of the present disclosure to provide a float bath for manufacturing a float glass having an improved structure for maintaining uniform temperature of a bottom casing of the float bath by suggesting a suitable diameter of the nozzles used in an air blower, a suitable pitch between the nozzles and a suitable interval between the nozzles and the bottom casing on the assumption that a flow rate of the cooling gas of the air blower for cooling the cooling bath and an inlet temperature are consistent. Another object of the present disclosure is to provide a cooling method of the float bath.

In one aspect, there is provided a float bath for manufacturing a float glass, which includes: a brick assembly composed of a plurality of bricks storing molten metal so that a float glass is capable of moving forward while floating on the molten metal; a bottom casing for forming an outer side of the brick assembly; and an air blower installed away from the bottom casing to supply a cooling air toward the bottom casing, wherein the air blower includes a plurality of nozzles having a diameter of about 30 mm and arranged with a pitch of about 250 mm to about 300 mm in order to cool the bottom casing to a predetermined temperature.

Preferably, the nozzles are spaced apart from the bottom casing by an interval of about 100 mm to 200 mm.

In another aspect, there is provided a method of cooling a float bath used for manufacturing a float glass, wherein a bottom casing surrounding a brick assembly capable of storing molten metal so that a float glass moves forward while floating on the molten metal is cooled by an air supplied from a plurality of nozzles installed below the bottom casing, and wherein, in the above cooling process, cooling uniformity is maintained by at least one of: (a) controlling a predetermined pitch between the nozzles; (b) controlling a diameter of each nozzle; and (c) controlling an interval between the nozzles and the bottom casing.

Preferably, in the step (a), the pitch is maintained in the range from about 250 mm to about 300 mm.

Preferably, in the step (b), the diameter of each nozzle is maintained to about 30 mm.

Preferably, in the step (c), the interval between the nozzles and the bottom casing is maintained in the range from about 100 mm to about 200 mm.

The float bath for manufacturing a float glass and its cooling method may give an optimized cooling effect under a given cooling air flow rate and a given inlet temperature by decreasing the diameter of the nozzles of the air blower and the pitch between the nozzles and/or maintaining the nozzles and the bottom casing to be closer. Therefore, the bottom casing of the float bath may have uniform temperature in an effective range, and therefore it is possible to further improve the quality of a final float glass product and to ensure a stable process.

BRIEF DESCRIPTION OF THE DRAWINGS

Other objects and aspects of the present invention will become apparent from the following descriptions of the embodiments with reference to the accompanying drawings in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, a float bath for manufacturing a float glass and a cooling method of the same according to a preferred embodiment of the present disclosure will be described in detail with reference to the accompanying drawings.

Figure 1:
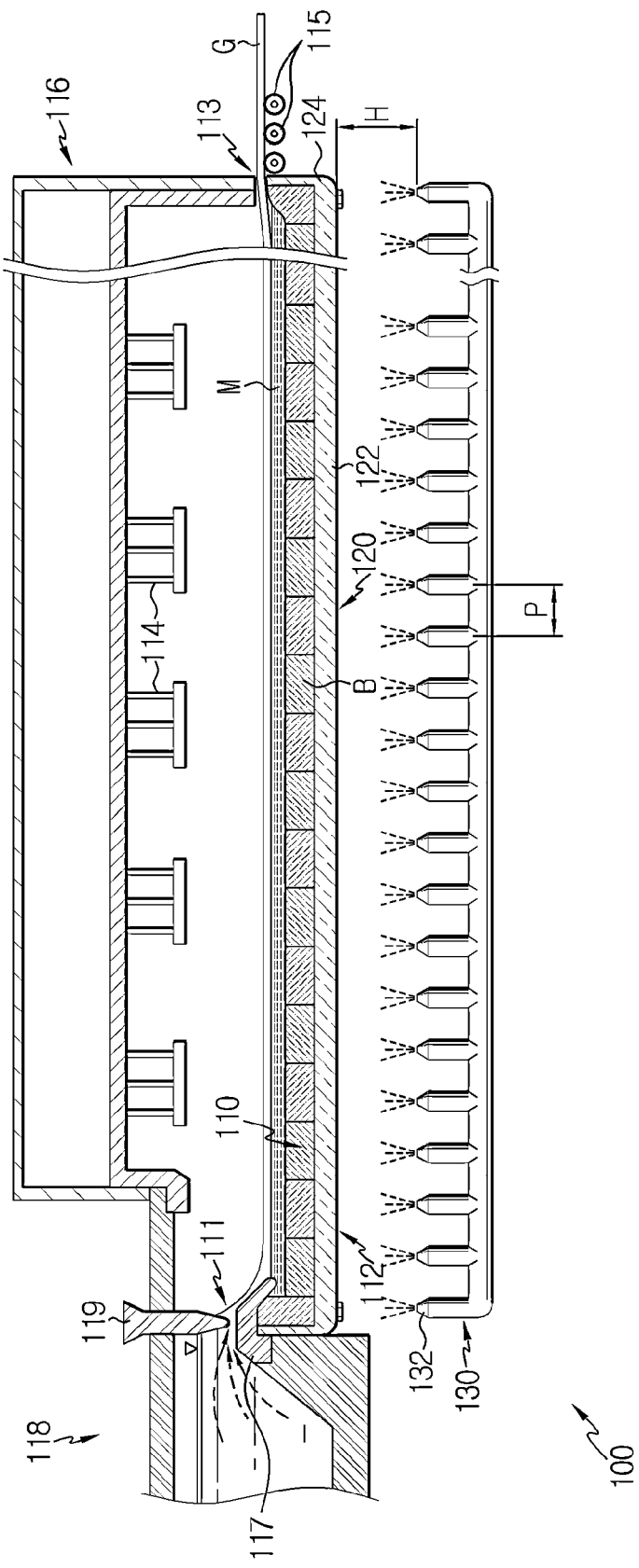
FIG. 1 is a front view schematically showing a float bath for manufacturing a float glass according to a preferred embodiment of the present disclosure.
Figure 2:
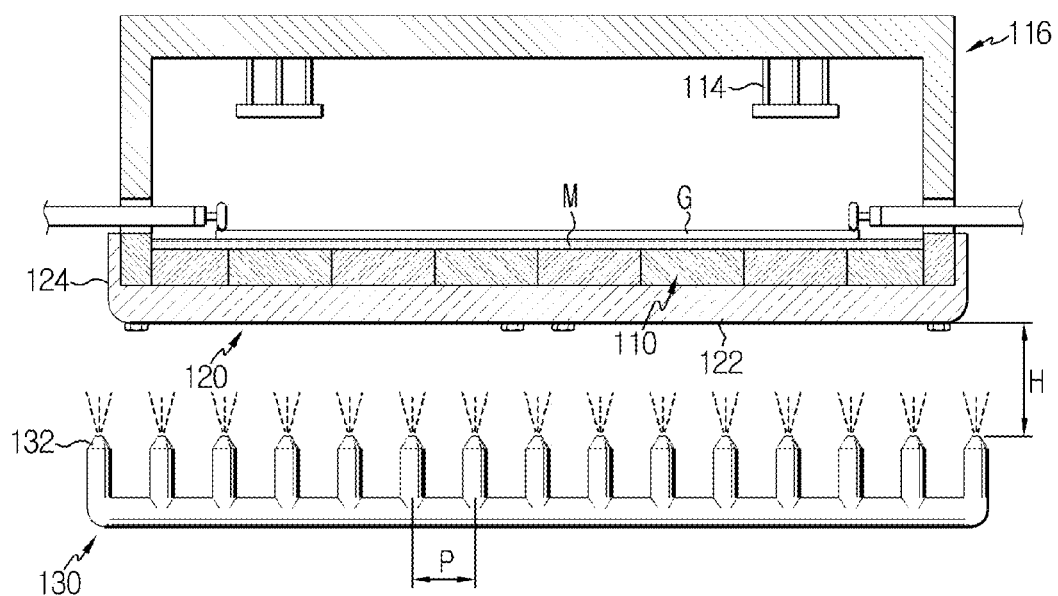
FIG. 2 is a side view showing the float bath of FIG. 1.

FIG. 1 is a front view schematically showing a float bath for manufacturing a float bath according to the preferred embodiment of the present disclosure, and FIG. 2 is a side view showing the float bath of FIG. 1.

Referring to FIGS. 1 and 2, a float bath 100 for manufacturing a float glass according to this embodiment includes a brick assembly 110 in which a plurality of bricks B are connected to each other so that a molten metal M is received therein, a steel bottom casing 120 installed to surround the outer side of the brick assembly 110, and an air blower 130 capable of injecting a cooling air toward the bottom casing 120 in order to cool the bottom casing 120.

The float bath 100 of this embodiment is used for manufacturing a float glass by means of a so-called floating method and has a float chamber 118 including a bottom 112 and a roof 116 covering the upper portion of the bottom 112 and having electric resistance heating elements 114 installed thereto. The float chamber 118 has a sealed configuration with an inlet 111 and an outlet 113.

The bottom 112 stores a molten metal M such as molten tin or molten tin alloy. A molten glass G supplied through the inlet 111 from a melting furnace 14 is weighted by a threshold 117 and a horizontal control tweel 119 and is introduced into the float chamber 118. While the molten glass G moves from an upstream side (a left portion in the figures) of the float chamber 118 to a downstream side (a right portion in the figures), the molten metal M flows by the molten glass G. In addition, the molten metal M flows from the upstream side to the downstream side of the float chamber 118 kept at a relatively high temperature due to the temperature gradient in the float chamber 118 and also flows from the center of the float chamber 118 in a length direction to both sides thereof. The molten glass G forms into a glass ribbon G with desired thickness and width while moving from the upstream side to the downstream side and is pulled by lift-out rollers 115 installed at the outlet 113 of the float chamber 118 to move away from the surface of the molten metal M at the take-off point. The glass ribbon G passes the lift-out rollers 115 and is delivered to an annealing lehr (not shown) of the next process.

The inside of the float chamber 118 is filled with a mixed gas of nitrogen and hydrogen. The mixed gas is kept at a pressure slightly higher than the atmospheric pressure. The molten metal M and the ribbon-shaped molten glass G are kept at about 800 to 1,300° C. by the electric resistance heating elements 114. The molten glass G is non-alkali glass, a soda lime glass, or the like. The principle or structure of generating a flow of the molten metal M in the float chamber 118 and the process of putting, forming into a ribbon shape, moving or discharging the molten glass G are already well known in the art as a floating process, and are not described in detail here.

The brick assembly 110 is configured by, for example, coupling a plurality bricks B such as refractory bricks. The brick assembly 110 may be classified into bottom lining bricks which directly stores the molten metal M and bottom insulating bricks arranged in contact with the inner surface of the bottom casing 120 to surround the bottom lining bricks. In this case, an inorganic adhesive may be filled between the bottom lining bricks and the bottom insulating bricks. Predetermined gaps are provided among the bricks B of the brick assembly 110, and these gaps are preferably appropriately determined in consideration of the elongation of the bricks caused by heating. In addition, individual bricks M should have corrosion resistance against the molten metal M, alkali resistance against $K_2O$ or $Na_2O$ included in the glass G, spalling resistance according to the change of temperature of a glass product, and so on. Moreover, the brick assembly 110 includes bottom bricks B forming the bottom 112 of the float chamber 118 and side bricks B forming the side of the float chamber 118.

The bottom casing 120 is classified into a base casing 122 installed to surround the outer circumference of the bottom bricks B and a side casing 124 installed in connection with the base casing 122 to surround the side bricks B. The bottom casing 120 is preferably made of common metal rigid and thick enough to support the brick assembly 110.

The air blower 130 includes nozzles 132 arranged in a predetermined pattern in a space between a support frame (not shown) supporting the float bath 100 and the bottom 112 of the float bath 100, namely the lower surface of the bottom casing 120. The air blower 130 cools the bottom casing 120 by means of the cooling air injected through the nozzles 132. The air blower 130 is operated by an operation source such as a fan. In other words, the brick assembly 110 and the bottom casing 120 heated by the high temperature in the float chamber 118 are cooled by the air blower 130.

The nozzles 132 of the air blower 130 are preferably designed in a predetermined pattern in order to maintain uniform temperature distribution of the float bath 100 in aspect of the quality (BOS) of the glass ribbon G. In a preferred embodiment of the present disclosure, each nozzle 132 has a diameter D of about 30 mm, which is about a half of the diameter of a conventional nozzle.

In a preferred embodiment, the pitch P between the nozzles 132 is preferably kept in the range from about 250 mm to about 300 mm. If the pitch P between the nozzles 132 is smaller than 250 mm, the number of the nozzles 132 is increased inefficiently. If the pitch P is greater than 300 mm, it is difficult to obtain uniform cooling effects.

In a preferred embodiment, the air blower 130 is installed so that the interval H between the nozzles 132 and the lower surface of the bottom casing 120 is kept in the range from about 100 mm to about 200 mm. If the air blower 130 is located so that the interval H between the nozzles 132 and the bottom casing 120 is smaller than 100 mm, the cooling air injected through the nozzles 132 is not uniformly dispersed to the lower surface of the bottom casing 120 but inefficiently converges on the surface of the bottom casing 120 corresponding to the center of the hole of the nozzles 132. If the interval H between the nozzles 132 and the bottom casing 120 is greater than 200 mm, it causes that much more loss of the cooling air and therefore the uniform cooling effect is not obtained.

In the above embodiments, it should be understood that the diameter D of the nozzles 132, the pitch P between the nozzles 132, and the interval H between the nozzles 132 and the bottom casing 120 are described on the assumption that the flow rate of the cooling air injected by the air blower 130 and the inlet temperature of the cooling air are consistent.

Table 1 shows the specifications of an experimental example according to the preferred embodiment of the present disclosure, such as a nozzle size and an interval between the nozzles and the bottom casing, in comparison to those of a comparative example according to the prior art.

TABLE 1

| Specifications | Experimental Example | Comparative Example |
| --- | --- | --- |
| Target temperature of the bottom casing (° C.) | 105 | 105 |
| Pitch (P) between the nozzles (mm) | 280 | 500 |
| Diameter (D) of the nozzles (mm) | 30 | 60 |
| Inlet temperature of the air (° C.) | 40 | 40 |
| Interval (H) between the nozzles and the bottom casing (mm) | 100 | 300 |

Figure 3:
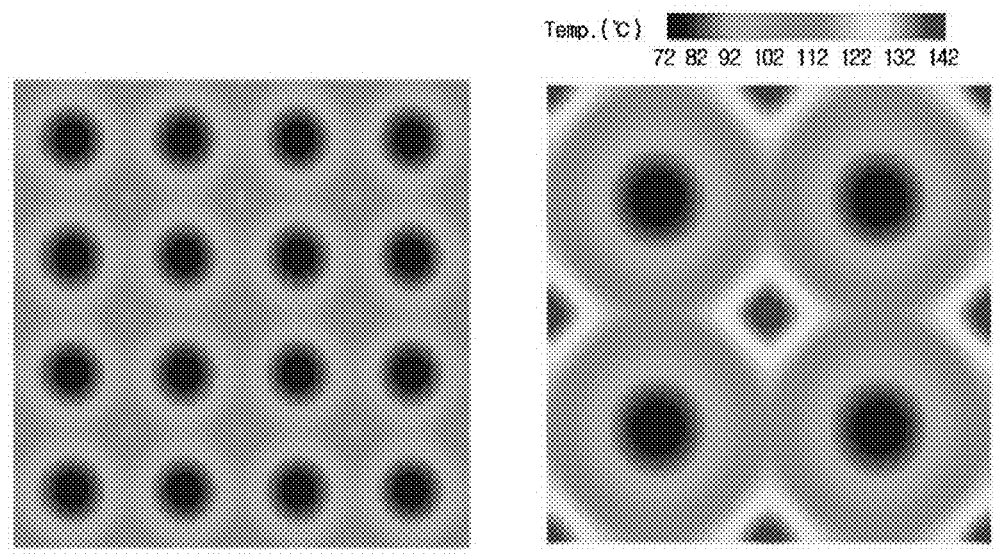
FIG. 3 are photographs showing the temperature distribution of a bottom casing of the float bath for manufacturing a float glass according to the preferred embodiment of the present disclosure in comparison to a conventional example.

FIG. 3 are photographs showing the temperature distribution of the bottom casing of the float bath for manufacturing a float glass according to the preferred embodiment of the present disclosure in comparison to a conventional example.

Referring to FIG. 3, the left portion of FIG. 3 shows temperature distribution of the bottom casing according to the preferred embodiment of the present disclosure, and the right portion of FIG. 3 shows temperature distribution of a bottom casing in the comparative example according to the prior art. By looking at the temperature distribution of the bottom casing shown in the left portion of FIG. 3, low-temperature regions shown in blue are arranged densely and high-temperature regions shown in red are not present, in comparison to the right portion showing the comparative example. Therefore, it could be understood that by decreasing the diameter of the nozzles by a half, decreasing the pitch between the nozzles by about a half, and decreasing the interval between the nozzles and the bottom casing by about ⅓, even more uniform temperature distribution may be obtained compared to that of a conventional one.

Table 2 shows the temperature improvement effects of the bottom casing of the float bath measured according to Table 1.

TABLE 2

| Items | Experimental Example | Comparative Example |
| --- | --- | --- |
| Average temperature of the bottom (° C.) | 91.7 | 103.5 |
| Highest temperature of the bottom (° C.) | 113.2 | 146.8 |
| Lowest temperature of the bottom (° C.) | 72.0 | 69.1 |

As shown in Table 2, it could be found that the temperature (the average, highest and lowest temperatures) of the bottom casing of the float bath according to the preferred embodiment of the present disclosure is sufficiently lowered. In addition, it could be found that the difference between the highest and lowest temperatures of the bottom casing greatly decreases in comparison to that of the comparative example. Therefore, according to the experimental example of the present disclosure, the temperature of the bottom casing may be more uniform than that of the comparative example according to the prior art.

Next, the cooling method of the float bath for manufacturing a float glass according to a preferred embodiment of the present disclosure will be described. In the method of cooling a float bath used for manufacturing a float glass, the bottom casing 120 surrounding the brick assembly 110 capable of storing a molten metal M so that a float glass moves forward while floating on the molten metal M is cooled by an air supplied from the plurality of nozzles 132 installed below the bottom casing 120, wherein, in the above cooling process, cooling uniformity is maintained by at least one of: (a) controlling a predetermined pitch P between the nozzles 132; (b) controlling a diameter D of each nozzle 132; and (c) controlling an interval between the nozzles 132 and the bottom casing 120. In other words, in the method of this embodiment, the cooling uniformity is maintained by simply decreasing the diameter D of the nozzles 132, decreasing the pitch P between the nozzles 132, or decreasing the interval H between the nozzles 132 and the bottom casing 120.

Here, in the step (a), the pitch P is maintained in the range from about 250 mm to about 300 mm. In addition, in the step (b), the diameter D of the nozzles 132 is maintained to about 30 mm. Moreover, in the step (c), the interval H between the nozzles 132 and the bottom casing 120 is maintained in the range from about 100 mm to about 200 mm.

By using the above conditions, the molten glass G put into the float chamber 118 may form a float glass G with better quality since the level of BOS which may be caused in forming the glass ribbon G may be lowered due to the uniform temperature distribution of the bottom casing 120 of the float bath 100.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

| Reference Symbols | |
| --- | --- |
| M: molten metal | G: molten glass, glass ribbon |
| B: brick | 110: brick assembly |
| 111: inlet | 112: bottom |
| 113: outlet | 114: heating element |

| Reference Symbols | |
|---|---|
| 115: lift-out roller | 116: roof |
| 117: threshold | 118: float chamber |
| 119: horizontal control tweel | |
| 120: bottom casing | 122: base casing |
| 124: side casing | 130: air blower |
| 132: nozzle | |

What is claimed is:

1. A float bath for manufacturing a float glass, comprising:
a brick assembly composed of a plurality of bricks storing molten metal so that a float glass is capable of moving forward while floating on the molten metal;
a bottom casing for forming an outer side of the brick assembly; and
an air blower installed under the bottom casing to supply cooling air toward the entire surface of the bottom casing,
wherein the air blower includes a plurality of nozzles having a circular opening and two-dimensionally arranged in a grid pattern so as to be located on a plane parallel to the bottom casing with the same width and length pitch of about 250 mm to about 300 mm and spaced apart from the bottom casing by an interval of about 100 mm to 200 mm in order to cool the bottom casing to a predetermined temperature.

2. A method of cooling a float bath used for manufacturing a float glass,
wherein a bottom casing surrounding a brick assembly capable of storing a molten metal so that a float glass moves forward while floating on the molten metal is cooled by an air supplied from a plurality of nozzles having a circular opening and two-dimensionally arranged in a grid pattern under the bottom casing, and
wherein, in the above cooling process, cooling uniformity is maintained by:
(a) controlling a predetermined pitch between the nozzles, wherein the width and length pitch is maintained in the range from about 250 mm to about 300 mm;
(b) controlling a diameter of each nozzle; and
(c) controlling an interval between the nozzles and the bottom casing, wherein said interval between the nozzles and the bottom casing is maintained in the range from about 100 mm to 200 mm.

3. The method of cooling a float bath according to claim 2, wherein, in the step (b), the diameter of each nozzle is maintained to about 30 mm.

* * * * *